Aug. 18, 1959     F. LOWERY ET AL     2,900,053
EMERGENCY BRAKING SYSTEM FOR VEHICLES
Filed Oct. 4, 1956     2 Sheets-Sheet 1

INVENTORS
FRED LOWERY
JOSEPH D. PHILLIPS
ATTORNEY

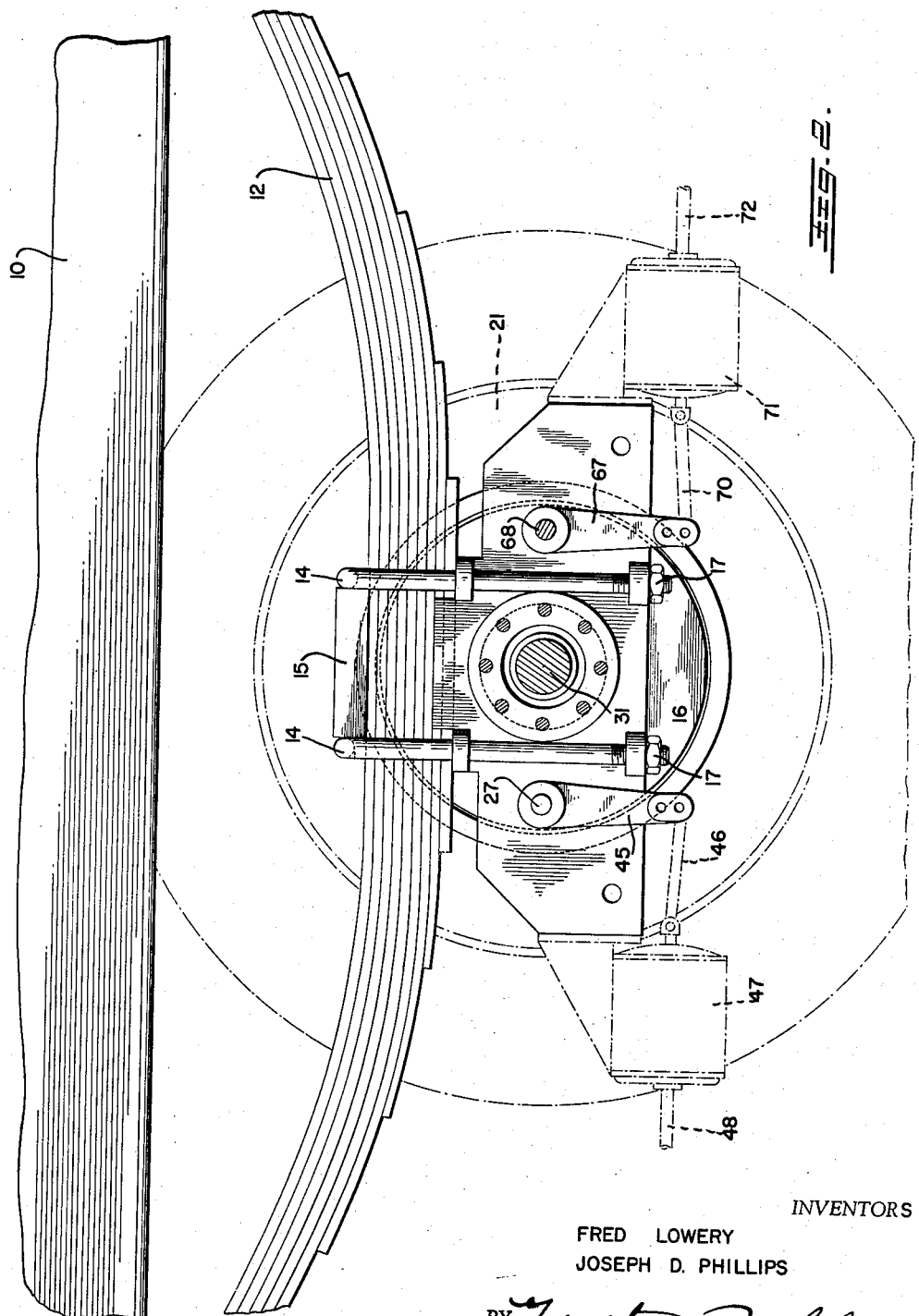

United States Patent Office 2,900,053
Patented Aug. 18, 1959

2,900,053
EMERGENCY BRAKING SYSTEM FOR VEHICLES
Fred Lowery and Joseph D. Phillips, Republic, Pa.
Application October 4, 1956, Serial No. 613,967
18 Claims. (Cl. 188—106)

This invention relates to emergency reserve brakes for tractor trailers and has for an object to provide additional or reserve emergency brakes, particularly useful on tractor trailers or other heavy vehicles which are subject to brake failure.

There have been numerous accidents recently, particularly on heavy tractor trailers where the trailers were travelling down long and steep hills, wherein the ordinary wheel brakes have given out either through being overheated or worn out in continuous use down a long hill as a result of which there has been brake failure and serious accidents not only wrecking the tractor and the trailer, but also causing injury and death to innocent bystanders who have been struck by such tractor trailers out of control.

It is an object of this invention to provide an additional emergency reserve brake which may be operated by a control means substantially identical with that for controlling the regular wheel brakes, and is always available in case the wheel brakes fail to operate properly.

A further object of this invention is to provide emergency reserve brakes for tractors which emergency reserve brakes may be even more powerful and have greater braking area and power than the wheel brakes used for ordinary stopping, a feature which is particularly useful in view of the fact that the tractor and trailer may already be going at exceedingly high speeds when it is discovered that the ordinary brake no longer holds, so that the emergency reserve brake of this invention can be immediately operated to bring the tractor and trailer under control and to a safe stop.

While the emergency reserve brake of this invention is particularly intended for heavy trailer-tractor combinations, the principles of this invention may obviously readily be applied to any kind of truck or vehicle or even to the ordinary automobile so as to provide an emergency reserve brake in case of failure of the original brakes.

A further object of this invention is to provide an emergency reserve brake particularly intended for trailers but useable on other vehicles wherein the emergency reserve brake is mounted on a two-part rotatable axle, the axle being directly or indirectly connected to the vehicle wheels with the regular brake mounted in the conventional manner on the vehicle wheels.

In the case of a trailer, non-rotating or fixed axles are usually provided, with the support wheels equipped with conventional brakes rotatably mounted on the ends of the axle but with this invention, rotating axles are provided on which the wheels are mounted, and the emergency reserve brake of this invention is mounted on the rotating axle which is divided into two parts secured together in axial alignment by standard but substantial bearing couplings so that one wheel may rotate faster than another as when rounding a curve or an uneven road when necessary.

Although the emergency reserve brakes of this invention may have the brakes serve as the usual normal brakes for the vehicle, it is preferred that the braking surface of the emergency reserve brakes of this invention be of substantially greater area than that of the normal vehicle brake. The normal vehicle brake is mounted outside of the spring support of the vehicle on the axle, while the emergency brake of this invention is mounted between the spring supports of the vehicle to the axle.

A further feature of this invention is that the emergency reserve brake of this invention may utilize standard parts already in existence, particularly as to bearings, to the brake operator parts which may be a duplicate of the brake operator parts used in controlling the regular or conventional brakes already present, the brake shoes and brake drums of this invention being likewise similar to the brake shoes and brake drums already existing except for the fact that the brake shoes and brake drums of this emergency reserve brake will have a greater braking area and be substantially wider than the conventional brakes up to the limit permitted by the distance between the springs and supporting parts between the springs and the vehicle on the axle.

With the foregoing and other objects in view, this invention comprises the combination, construction, and arrangement of parts hereinafter set forth, claimed, and disclosed in the accompanying drawing wherein:

Fig. 2 is a sectional view on line 2—2 of Fig. 1.

Figure 1:
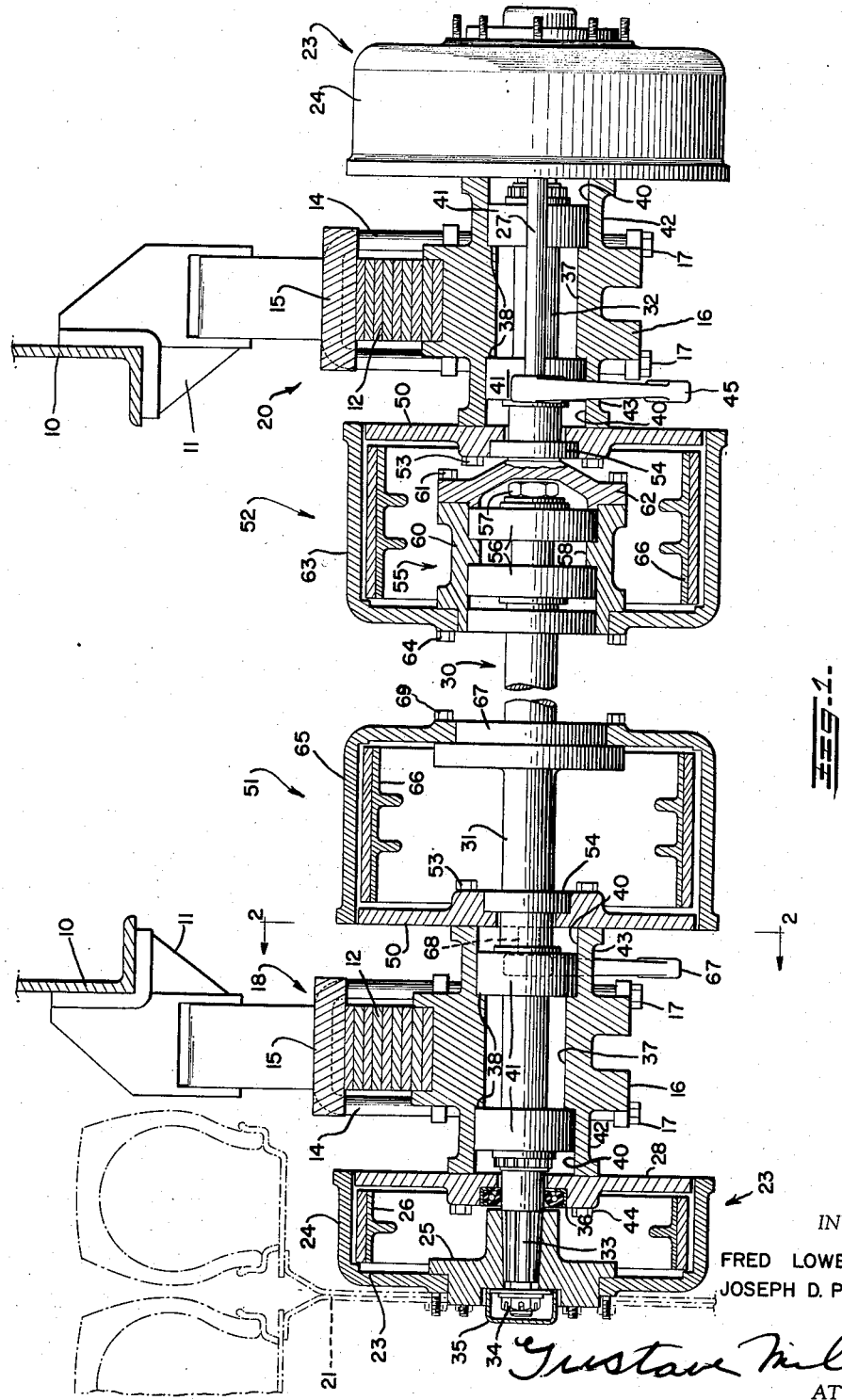
Fig. 1 is a partly sectional and partly elevational view of the emergency brake system of this invention.

There is shown at 10 the under-construction for underframe of an automotive vehicle which may be a heavy trailer but may also be a truck body or other automotive vehicle, which vehicle is supported by means of the spring hangers 11 and the usual springs 12, spring 12 being secured by means of conventional U-bolts 14 and bumper plates 15 through the vehicle supporting axle mounting 16, the U-bolts 14 being secured in position by nuts 17.

There are two vehicle-supporting means 18 and 20 thus described, the vehicle-supporting means 20 being under one longitudinal side of the vehicle and the vehicle-supporting means 18 being under the other longitudinal side of the vehicle in the usual manner with the usual spacing therebetween.

Vehicle support wheels 21 (only one of which is shown) are provided at each side of the vehicle, and each of the wheels 21 is equipped with the usual conventional brakes 23 consisting of brake drums 24 mounted on the wheel hub 25, and the brake shoes 26 operable by brake operator shaft 27 extending through suitable bushing (not shown) in the axle mounting 16 and the brake housing plate 28 for actuating the brake shoes 26 by the usual means (not shown). Brake operator levers 45 are connected by links 46 through the usual hydraulic cylinders 47 and hydraulic pipes 48 to the usual brake control means (not shown) at the driver's seat. All the brake parts and bearing parts and support wheels thus far described are conventional such as found on every automotive vehicle.

In heavy truck trailers, the vehicle support wheels are usually rotatably mounted on the ends of non-rotating axles. In this invention, there is provided a two-part axle 30 arranged to rotatably extend through the vehicle supporting axle mounting 16 and have the vehicle support wheels 21 fixedly secured on the ends of the axle in the usual position on the outer side of the axle mounting 16. In this case, each axle part 31 and 32 terminates in a splined, slightly coned portion 33, and the wheel hub 25 has an axle receiving opening complementary in shape to the splined coned end 33 of the axle part to which it is secured in a conventional manner by a nut 34 within the dust cap 35. A grease seal 36 is provided on the axle parts where they extend through the brake housing plates 28.

Each axle part is journaled through the axle mounting 16, the axle mounting 16 being provided with a central bore 37 at the center thereof terminating in shoulders 38 leading to end bore 40. Bearing housings 41 inserted through the large bores 40 abut against the shoulders 38 and provide a conventional type of bearing through which the axle 30 is journaled for rotation, the bearing housings 41 having the usual conventional bearings and other conventional bearing parts and grease seals not shown.

As it will be noted, the large bores 40 are provided within extending flanges 42 and 43 on opposite sides of the main parts of the axle mounting 16. The flange 42 extending outwardly of the vehicle provides a support for the brake 28 which is secured thereto in a conventional manner by studs 44.

A similar brake housing plate 50 forms part of the emergency brake 51 and 52 of this invention, the brake housing plate 50 being similarly secured by studs 53 to the axle mounting extension flanges 43. Conventional grease seals 54 are provided where the axle parts 31 and 32 extend through the brake housing plates 50.

The two axle parts 31 and 32 of the two-part axle 30 are rotatably secured in axial alignment by means of a rotative coupling 55. Any suitable rotatable coupling may be provided for thus securing the axial parts 31 and 32 capable of rotation relative to each other, one such coupling as here shown consisting of a pair of bearing housings 56 secured by means of a nut 57 and a spacing offset 58 within a coupling housing 60 whereby the axle part 31 may rotate freely within the coupling housing 60.

The coupling housing 60 is attached by studs 61 to an end plate 62 which in turn is secured on or integral with the inner end of axle part 32.

A brake drum 63 similar in construction and operation to the brake drums 23 and 24 but preferably of substantially greater width is secured by studs 64 to the coupling housing 60 and thus by studs 61 to the axle part 32.

The brake drum 65 of emergency brake 51, substantially identical with brake drum 63, is secured by studs 69 and is mounted on an off-set collar 67 integrally or fixedly secured to the axle part 31.

As a result of this mounting the brake drum 65 is securely mounted on the axle part 31 and similarly the brake drum 63 is securely mounted on the axle part 32. Identical brake shoe means 66 are mounted within each brake drum 65 and 63 and are each operable in a conventional manner by brake operator levers 67 mounted on operator shafts 68 journaled at one end in the axle mounting 16 and at the other end extending through the emergency housing plate 50 to operate brake shoe means 66 in the conventional manner.

A driver controlled emergency brake control means is provided which may be identical with that of the regular brake control means, and includes an operative link 70 similar to link 46, a brake cylinder 71 similar to brake cylinder 47, and a hydraulic pipe 72 similar to hydraulic pipe 48. The brake control mechanism at the driver's position may be identical for each of the regular brakes and the emergency brakes, or they may be somewhat differentiated and possibly positioned a slight distance apart so that the control mechanism for the emergency brake will not be confused with the control mechanism for the regular brake.

The brake shoes 66 within their brake drums 63 and 65 are located between the axle support mountings 16 while the regular brakes 23 and 24 are mounted outside the axle support mountings 16, between such axle support mounting 16 and the support wheels 21. The width of the brake shoe means 26 and the brake drums 23 and 24 is limited by the available space outside the axle support mountings 16 and are of conventional size as a result, but the emergency brakes 51 and 52 of this invention located between the axle support mountings 16 are limited to a size not greater than slightly less than half this distance between the axle support mountings 16, and hence are and preferably will be of substantially greater width and therefore greater braking power than the braking power of the regular brakes.

Obviously, if the axle part coupling means were centered beneath the vehicle, the braking power and size of the emergency brake drums would be more limited than that shown in the present invention wherein the axle part coupling means is offset to one side of the center of the vehicle, and one of the emergency brakes as at 52 is mounted so that it extends over the axle coupling means. Also, a much stronger axial coupling may be thus provided inasmuch as the coupling 55 may take up almost half the width of the space between the axle supporting brackets 16 and thus provide a coupling that is as strong as though the axle 30 were a single integral piece rather than two axial parts rotatably coupled together, thus permitting one support wheel to rotate faster or slower than the other as necessary particularly in rounding curves, and to rotate at a simultaneous speed when the vehicle is travelling in a straight ahead direction. The assembly of the parts, using mostly standard parts and standard bearings wherever possible, will be obvious from the foregoing description.

In operation, the driver will control his regular vehicle brakes 23 and 24 in the usual manner. In an emergency however should his regular brakes fail as may happen sometimes when going down a long hill, the driver will merely operate his emergency control mechanism brakes to bring the vehicle even though heavily loaded and already operating at an excessive speed, safely under control, for with the extra width of the emergency brakes 51, more braking power is provided in the emergency brakes 51 than is provided in the regular brakes 23 and 24. There is thus provided an emergency brake system held in reserve but ready for operation at any time.

While the emergency brake system of this invention has been shown and in structure thereof described in detail, it is obvious that this invention is not to be considered limited to the exact forms disclosed, and that changes may be made therein within the scope of what is claimed without departing from the spirit of the invention.

Having thus set forth and disclosed the nature of this invention, what is claimed is:

1. An emergency brake system for a heavy trailer automotive vehicle having brake equipped support wheels and two vehicle supporting means mounted between the support wheels, said emergency brake system comprising a two part axle, means rotatively coupling the inner ends of said two part axle together between the two vehicle supporting means, the outer ends of said two part axle being rotatively journaled through the vehicle supporting means and having the brake equipped support wheels mounted thereon, and emergency brakes mounted on each inner end of said two part axle, between the axle coupling and the two vehicle supporting means, one of said emergency brakes completely enclosing said rotative coupling means.

2. The emergency brake system of claim 1, said emergency brakes being of substantially greater width and braking power than the brakes equipping the support wheels.

3. An emergency brake system for an automotive vehicle having brake equipped support wheels and two vehicle supporting means mounted between the brake equipped support wheels, said emergency brake system comprising a two part axle, means rotatively coupling the inner ends of said two part axle, said two part axle parts each being rotatively journaled through the vehicle supporting means and having the support wheels and their brakes mounted on the outer ends thereof and emergency brakes mounted on each inner end of said two part axle between the inner end and the two vehicle supporting means, one of said emergency brakes completely enclosing said rotative coupling means.

4. A brake system for an automotive vehicle having two support wheels and two vehicle supporting means mounted between the support wheels, said brake system comprising a two part axle, means rotatively coupling the inner ends of said two part axle together between the two vehicle supporting means, the outer ends of said two part axles being rotatively journaled through the vehicle supporting means and having the support wheels fixedly mounted thereon, and two brakes, one of said two brakes being mounted on each inner end of said two part axle, between the axle coupling and the two vehicle supporting means, one of said two brakes completely enclosing said rotative coupling means.

5. The brake system of claim 4, each said inner axle end brake being of a width slightly less than half the distance between said two vehicle supporting means.

6. A braking system for an automotive vehicle having two support wheels and vehicle supporting means operatively mounted on the support wheels, a two part axle journaled through the two vehicle supporting means and having the support wheels operatively mounted on the outer ends of said two part axle, the inner ends of said two part axle being axially aligned and means rotatively coupling said inner axle part ends together between the two vehicle supporting means, a brake comprising a brake drum operatively secured to each axle part between said inner axle ends and the two vehicle supporting means, one of said brakes completely enclosing said rotative coupling means, and brake shoe means and a brake operator operatively connected with each said brake drum.

7. An emergency braking system for an automotive vehicle having a plurality of support wheels equipped with brakes mounted between the support wheels and two spaced apart vehicle supporting means operatively mounted on the support wheels, a two part axle journaled through the two vehicle supporting means and having the support wheels and its brakes operatively mounted on the outer ends of said two part axle, the inner ends of said two part axle being axially aligned and means rotatively coupling said inner axle ends together between the two vehicle supporting means, an emergency brake comprising an emergency brake drum operatively secured to each axle part between said inner axle ends and the two vehicle supporting means, one of said emergency brakes completely enclosing said rotative coupling means, and brake shoe means and a brake operator operatively connected with each said emergency brake drum.

8. An emergency braking system for an automotive vehicle having a plurality of support wheels equipped with brakes mounted between the support wheels and two spaced apart vehicle supporting means operatively mounted on the support wheels, a two part axle journaled through the two vehicle supporting means and having the support wheels and its brakes operatively mounted on the outer ends of said two part axle, an emergency brake comprising an emergency brake drum operatively secured to each axle part between said inner axle ends and the two vehicle supporting means, means rotatively coupling said inner axle ends together and completely enclosed within one of said emergency brakes, and brake shoe means and a brake operator operatively connected with each said emergency brake drum.

9. An emergency braking system for an automotive vehicle having a plurality of support wheels equipped with brakes mounted between the support wheels and two spaced apart vehicle supporting means operatively mounted on the support wheels, a two part axle journaled through the two vehicle supporting means and having the support wheels and its brakes operatively mounted on the outer ends of said two part axle, the inner ends of said two part axle being axially aligned, means rotatively coupling said inner axle ends together between the two vehicle supporting means, an emergency brake comprising an emergency brake drum operatively secured to each axle part between said inner axle ends and the two vehicle supporting means, one of said emergency brakes completely enclosing said rotative coupling means, and brake shoe means and a brake operator operatively connected with each said emergency brake drum.

10. An emergency brake system for a heavy trailer automotive vehicle having brake equipped support wheels and two vehicle supporting means mounted between the support wheels, said emergency brake system comprising a two part axle having each part journaled in one of the two vehicle supporting means, the outer ends of said two part axles having the support wheels and their equipped brakes mounted thereon, and emergency brakes mounted on each inner end of each part of said two part axle between the axle part inner end and the vehicle supporting means, means rotatively coupling said inner axle part ends together, said coupling means being entirely enclosed within one of said emergency brakes, said inner axle end brakes being of substantially greater width and braking power than the support wheel equipped brakes.

11. In an automotive vehicle having a plurality of support wheels each having individual brake shoe means and brake drums operatively associated therewith and located between the vehicle wheels and each of the two vehicle supporting means on and adjacent each end of the vehicle wheel axle on which the wheels are operatively mounted, and a brake operator for each individual brake shoe means; an emergency brake system comprising a rotatively mounted axle consisting of two axially aligned parts and means rotatively coupling said aligned parts together, each axle part being journaled through one of the two vehicle supporting means, an individual brake drum operatively secured to each said rotative axle part between said two vehicle supporting means, a brake shoe means operatively associated with each said latter brake drum and operatively mounted on one of said two vehicle supporting means and a brake operator for each said latter brake shoe means, one of said emergency brake drums completely enclosing said rotative coupling means, the vehicle support wheels being mounted on said rotatively mounted axle, the braking power of said emergency system brake shoe means and brake drums between the vehicle supporting means being substantially greater than the braking power of the vehicle brake shoe means and drums between the wheels and the two vehicle supporting means, each said emergency brake shoe means and drum being of a width up to slightly less than half the distance between the two vehicle supporting means.

12. In an emergency braking system for brake equipped support wheels of an automotive vehicle having two vehicle supporting means; an axle arranged to be rotatively journaled through the two vehicle supporting means, the brake equipped support wheels being mounted on the outer ends of said axle, and emergency brake means fixedly mounted on said rotating axle between the two vehicle supporting means, said axle comprising two axially aligned axle parts and coupling means between the two vehicle supporting means rotatively securing said axle parts together, said coupling means being completely enclosed within said emergency brake means.

13. In the emergency braking system of claim 12, said emergency brake means comprising an individual brake operatively mounted on each axle part between said coupling means and the two vehicle supporting means.

14. An emergency braking system for the brake equipped support wheels of an automotive vehicle, said vehicle having two vehicle supporting means, said supporting means including journal bearing spring mountings, an axle rotatively journaled through the said two vehicle supporting means, the brake equipped support wheels being mounted on the outer ends of said axle, and emergency brake means mounted on said rotating axle between the two vehicle supporting means, said axle comprising two axially aligned axle parts, each axle part being individually journaled in said vehicle supporting means and coupling means between the two vehicle supporting means rotatively securing said axle parts together and completely enclosing said emergency brake means.

15. An emergency braking system for the brake equipped support wheels of an automotive vehicle, said vehicle having two vehicle supporting means, said supporting means including journal bearing spring mountings, an axle rotatively journaled through the said two vehicle supporting means, the brake equipped support wheels being mounted on the outer ends of said axle, and emergency brake means mounted on said rotating axle between the two vehicle supporting means, said axle comprising two axially aligned axle parts, each axle part being individually journaled in said vehicle supporting means and coupling means between the two vehicle supporting means rotatively securing said axle parts together, said emergency brake means comprising an individual brake operatively mounted on each axle part between said coupling means and the two vehicle supporting means, said coupling means being completely enclosed within one of said individual emergency brakes.

16. In an emergency braking system for the brake equipped support wheels of an automotive vehicle having two vehicle supporting means; an axle consisting of two aligned axle parts and means rotatively coupling said axle parts together, said axle parts being arranged to be rotatively journaled through the two vehicle supporting means, the brake equipped support wheels being mounted on the outer ends of said axle, and emergency brake means mounted on said rotating axle between the two vehicle supporting means, said emergency brake comprising an individual brake operatively mounted on each said axle part between the two vehicle supporting means said coupling means being completely enclosed within one of said individual emergency brakes.

17. In an automotive vehicle having a plurality of support wheels each having individual brake shoe means and brake drums operatively associated therewith and located between the vehicle wheel and each of the two vehicle supporting means on and adjacent each end of the vehicle wheel axle on which the wheels are operatively mounted, and a brake operator for each individual brake shoe means; an emergency brake system comprising a rotatively mounted axle consisting of two axially aligned parts, means rotatively coupling said aligned axle parts together between the two vehicle supporting means through which said axle parts are journaled, an individual brake drum operatively secured to each said rotative axle part between said two vehicle supporting means, a brake shoe means operatively associated with each said latter brake drum and operatively mounted on said two vehicle supporting means and a brake operator for each said latter brake shoe means, said rotative coupling means being entirely enclosed within one individual emergency brake drum, the vehicle support wheels being mounted on said rotatively mounted axle, the braking power of said emergency system brake shoe means and brake drums between the vehicle supporting means being substantially greater than the braking power of the vehicle brake shoe means and drums between the wheels and the two vehicle supporting means.

18. In an automotive vehicle having a plurality of support wheels each having individual brake shoe means and brake drums operatively associated therewith and located between the vehicle wheels and each of the two vehicle supporting means on and adjacent each end of the vehicle wheel axle on which the wheels are operatively mounted; an emergency brake system comprising a rotatively mounted axle consisting of two axially aligned parts, means rotatively coupling said aligned parts together between the two vehicle supporting means, an individual brake drum operatively secured to each said rotative axle part between said two vehicle supporting means, said rotative coupling means being entirely enclosed within one of said individual emergency brake drums, a brake shoe means operatively associated with each said latter brake drum and operatively mounted on said two vehicle supporting means and a brake operator for each said latter brake shoe means, the vehicle support wheels being mounted on said rotatively mounted axle.

References Cited in the file of this patent

FOREIGN PATENTS

| | | |
|---|---|---|
| 868,395 | Germany | Feb. 26, 1953 |
| 930,492 | Germany | July 18, 1955 |